(12) United States Patent
Asada

(10) Patent No.: US 7,369,840 B2
(45) Date of Patent: May 6, 2008

(54) NOTIFICATION SYSTEM, AND METHOD FOR REMOTELY TURNING ON CELLULAR PHONE BEING IN POWER-OFF STATE AND CELLULAR PHONE THEREOF

(75) Inventor: Kenichi Asada, Tokyo (JP)

(73) Assignee: NEC Corporation (JP)

( * ) Notice: Subject to any disclaimer, the term of this patent is extended or adjusted under 35 U.S.C. 154(b) by 870 days.

(21) Appl. No.: 10/006,577

(22) Filed: Dec. 6, 2001

(65) Prior Publication Data

US 2002/0072396 A1 Jun. 13, 2002

(30) Foreign Application Priority Data

Dec. 7, 2000 (JP) ............... 2000-372940

(51) Int. Cl.
*H04Q 7/20* (2006.01)
(52) U.S. Cl. ............... 455/404.1; 455/404.2; 455/456.1
(58) Field of Classification Search ........... 455/404.1, 455/404.2, 521, 456.1, 343.1, 343.2, 352, 455/418–420, 70, 68, 574, 572, 127.5, 517, 455/41.1–41.3, 88, 502, 567, 550.1, 552.1; 340/539.11, 539.13
See application file for complete search history.

(56) References Cited

U.S. PATENT DOCUMENTS

| 4,989,230 A | * | 1/1991 | Gillig et al. | ............. | 455/552.1 |
| 6,169,905 B1 | * | 1/2001 | Fukuda | ............. | 455/462 |
| 2004/0180668 A1 | * | 9/2004 | Owens et al. | ............. | 455/456.1 |

FOREIGN PATENT DOCUMENTS

| JP | 8-336179 A | 12/1996 |
| JP | 10-307179 A | 11/1998 |
| JP | 11-252664 A | 9/1999 |

* cited by examiner

*Primary Examiner*—Jean Gelin
(74) *Attorney, Agent, or Firm*—Dickstein, Shapiro, LLP.

(57) ABSTRACT

In a notification system for communicating between a sender cellular phone possessed by a sending person and a receiver cellular phone possessed by a receiving person, the sender cellular phone, which is possessed by the sending person who wants to communicate with the receiving person, is allowed to transmit an ON state indication signal indicating to switch a main power source to be in an ON state through a radio wave to the receiver cellular phone being in an OFF state. Thus, a main power source of the receiver cellular phone can be remotely turned ON.

3 Claims, 4 Drawing Sheets

NOTIFICATION SYSTEM, AND METHOD FOR REMOTELY TURNING ON CELLULAR PHONE BEING IN POWER-OFF STATE AND CELLULAR PHONE THEREOF

BACKGROUND OF THE INVENTION

1. Field of the Invention

The present invention generally relates to a cellular phone, and more particularly to the cellular phone in which a power of a receiver side being in a OFF state can be turned ON by a sender side when the sender side needs to send the receiver side urgent information, and a method for setting the cellular phone being in a power-OFF state to a power-ON state.

The present application claims priority of Japanese Patent Application No. 2000-372940 filed on Dec. 7, 2000, which is hereby incorporated by reference.

2. Description of the Related art

If a conventional cellular phone at a receiver side is turned OFF or the conventional cellular phone is located in a non-communicable area of a radio wave, it may be impossible for a conventional cellular phone at a sender side to communicate smith the conventional cellular phone at the receiver side even if a sending person has the cellular phone to communicate with another person having the cellular phone at the receiver side.

An occurrence of being located in the non-communicable area is becoming less because recently, in some countries, for example, in Japan, the non-communicable areas are quite limited. Even if the conventional cellular phone of the receiving person is located in the non-communicable area, generally, it becomes communicable when the receiving person approaches near a vicinity of a communicable area.

However, in any case in which the conventional cellular phone at the receiver side is turned OFF, it is impossible to recognize a call or a notification for the receiving person unless the receiving person turns ON the conventional cellular phone.

SUMMARY OF THE INVENTION

In view of the above, It is a general object of the present invention to provide a notification-system in which the above-mentioned problems are eliminated.

A more specific object of the present invention is to provide the notification system that can notify or confirm a location of a cellular phone of a receiving person even if the cellular phone is turned OFF.

According to a first aspect of the present invention, there is provided a notification system for communicating between at least two cellular phones as a sender cellular phone possessed by a sending person and a receiver cellular phone possessed by a receiving person, the notification system including:

a system configuration for allowing the sender cellular phone possessed by the sending person who wants to communicate with the receiving person, to transmit an ON state indication signal indicating to switch a main power source to be in an ON state through a radio wave to the receiver cellular phone being in an OFF state, such that said main power source of the receiver cellular phone is remotely turned ON.

In the foregoing first aspect, a preferable mode is one wherein after the receiver cellular phone becomes in the ON state, the receiver cellular phone is notified that a call is received.

According to a second aspect of the present invention, there is provided a notification system for communicating between at least two cellular phones as a sender cellular phone possessed by a sending person and a receiver cellular phone possessed by a receiving person, the notification system including:

a base station controlling device for receiving receiver information concerning the receiver cellular phone which main power source is in an OFF state, and for controlling at least one base station covering an area indicated in the receiver information; and a base station for sending the receiver information, wherein:

the base station includes a sub-system configuration for sending power-ON information based on the receiver information received from the base station controlling device; and the receiver cellular phone includes a device configuration for receiving the power-ON information from the base station even if the main power source is in the OFF state.

In the foregoing second aspect, a preferable mode is one wherein the receiver information includes at least one of a receiver cellular phone telephone number, a password to access the receiver cellular phone, and area information indicating an area where the receiving person is predicted to be.

Another preferable mode is one that wherein further includes a location information system for sending the receiver information, a signal for switching the receiver cellular phone to be in the ON state by incorporating into a Global Positioning Satellite signal.

According to a third aspect of the present invention, there is provided a method for communicating between at least two cellular phones as a sender cellular phone possessed by a sending person and a receiver cellular phone possessed by a receiving person, the method including a step of:

(a) allowing the sender cellular phone possessed by the sending person who wants to communicate with the receiving person, to transmit an ON state indication signal indicating to switch a main power source to be in an ON state through a radio wave to the receiver cellular phone being in an OFF state, such that the main power source of the receiver cellular phone is remotely turned ON.

In the foregoing third aspect, a preferable mode is one wherein after the step (a) confirms that the main power source of the receiver cellular phone to be notified is in the OFF state, the step (a) allows the sender cellular phone possessed by the sending person who wants to communicate with the receiving person, to transmit the ON state indication signal indicating to switch the main power source to be in the ON state through the radio wave to the receiver cellular phone being in the OFF state, such that the main power source of the receiver cellular phone is remotely turned ON.

Another preferable mode is one wherein after the receiver cellular phone becomes in the ON state, the receiver cellular phone is notified that a call is received.

According to a fourth aspect of the present invention, there is provided a cellular phone including a device configuration for receiving a signal for switching to be in an ON state from a base station and being capable of switching a main power source to be in the ON state even if the main power source is in the OFF state.

In the foregoing fourth aspect, a preferable mode is one that wherein further includes:

a synchronization establishing section (circuit) for establishing synchronization with the base station;

a main power source ON information detecting section (circuit) for extracting main power source ON information from a radio wave transmitted from the base station; and a power source section (circuit) for supplying electric power to the main power source ON information detecting section (circuit) and the main power source ON information detecting section (circuit) to be kept in an ON state, even if the main power source is in the OFF state, and for turning ON the main power source when the main power source ON information is input from the main power source ON information detecting section (circuit).

Another preferable mode is one that wherein further includes:

a location information detecting section (circuit) for detecting location information and main power source ON information from a Global Positioning Satellite signal;

a main power source ON information detecting section (circuit) for detecting the main power source ON information from the Global Positioning Satellite signal; and a power source section (circuit) for supplying electric power to the main power source ON information detecting section (circuit) and the location information detecting section (circuit) to be kept in an ON-state, even if the main power source is in the OFF state, and for turning ON the main power source when the main power source ON information is input from the main power source ON information detecting section (circuit).

A further preferable mode is one that wherein is used as the receiver cellular phone in a notification system for communicating between at least two cellular phones as the sender cellular phone possessed by the sending person and the receiver cellular phone possessed by the receiving Person, wherein the notification system includes:

a system configuration for allowing the sender cellular phone possessed by the sending person who wants to communicate with the receiving person, to transmit an ON state indication signal indicating to switch the main power source to be in the ON state through a radio wave to the receiver cellular phone being in the OFF state, such that the main power source of the receiver cellular phone is remotely turned ON.

An addition preferable mode is one that wherein is used as the receiver cellular phone in a notification system for communicating between at least two cellular phones as the sender cellular phone possessed by the sending person and the receiver cellular phone possessed by the receiving person, with a system configuration for allowing the sender cellular phone possessed by the sending person who wants to communicate with the receiving person, to transmit the ON state indication signal indicating to switch the main power source to be in the ON state through a radio wave to the receiver cellular phone being in the OFF state;

wherein the notification system includes:

a base station controlling device for receiving receiver information concerning the receiver cellular phone which the main power source is in the OFF state, and for controlling at least one base station covering an area indicated in the receiver information;

a base station for sending the receiver information; and a location information sub-system for sending the receiver information, a signal for switching the receiver cellular phone to be in the ON state by incorporating into a Global Positioning Satellite signal, wherein:

the base station includes a sub-system configuration for sending power-ON information based on the receiver information received from the base station controlling device; and the receiver cellular phone includes a device configuration for receiving the power-ON information from the base station even if the main power source is in the OFF state.

With the configurations of the above aspects, even if the receiver cellular phone is in the power-OFF state, the sender cellular phone 1 can be communicable with the receiver cellular phone. Also, the notification system can detect the location of the receiving person.

By using such as a cellular phone as the sender cellular phone 1 or the receiver cellular phone 5, especially, in a case in which the sending person wants to contact to the receiving person in an emergency, a communication between the sending person and the receiving person can-be secured within a remarkably shorter time. And since the sending person can know the location of the receiving person, the sending person can estimate a time required to reach a target destination for the receiving person in a case in which the sending person wants the receiving person to be back. Thus, it is possible for the sending person and the receiving person to make a prompt action. For example, in a case in which the receiving person is a doctor, the sending person can promptly call the doctor, or the sending person can reach a place of the doctor (receiving person).

BRIEF DESCRIPTION OF THE DRAWINGS

Other objects, features, and advantages of the present invention will become more apparent from the following detailed description when read in conjunction with the accompanying drawings, in which.

DESCRIPTION OF THE PREFERRED EMBODIMENTS

Embodiments will now be described according to the present invention.

A notification system according to the present invention is characterized in that a cellular phone at a receiver side can be turned ON by another cellular phone conducting a certain operation at a sender side.

First Embodiment

A first embodiment will be described with reference to FIGS. 1 and 2, according to the present invention.

Figure 1:
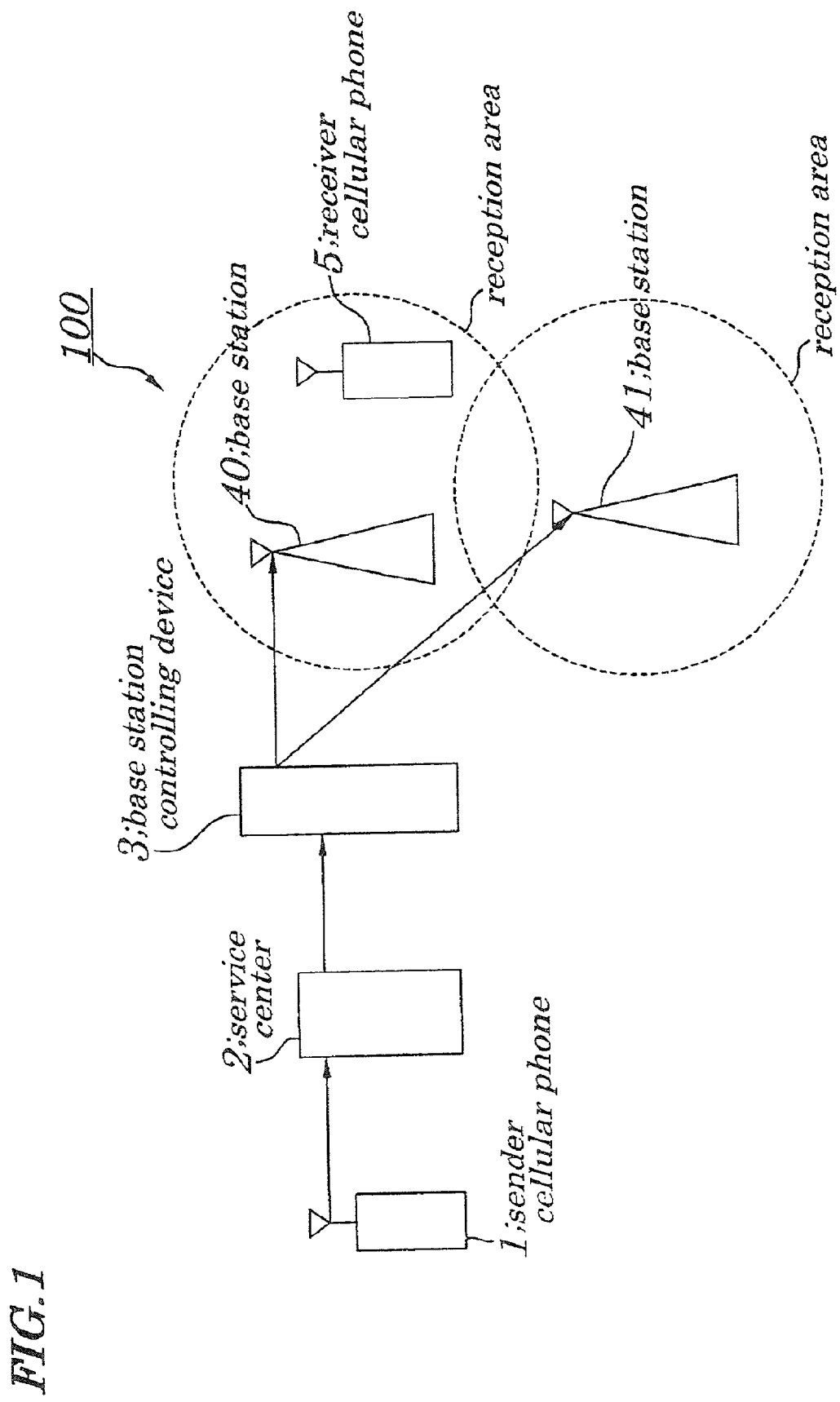
FIG. 1 is a diagram showing a configuration of a notification system according to a first embodiment of the present Convention.

As shown in FIG. 1, a notification system 100 according to the first embodiment of the present invention includes a communication device (a sender cellular phone 1) at a sender side, a service center 2, a base station controlling device 3, at least one of a plurality of base stations 40, 41, . . . (hereinafter may be called base station 40 for convenience for general expression) within a reception area that may contact with a receiver cellular phone 5 to be notified, and the receiver cellular phone 5.

The sender cellular phone 1 as the communication device at the sender side sends receiver information to the service center 2 and the service center 2 receives the receiver information. The sender cellular phone 1 can be a terminal communicable to any one of a wire telephone, a cellular phone, a telephone being Internet connectable such as an Internet telephone, and a like. For example, the receiver information includes a cellular phone telephone number of the receiving cellular phone 5, a password that is set to the receiving cellular phone 5 of the receiving person beforehand, area information indicating an area where the receiving person receiving cellular phone 5 is predicted to be.

In addition, the service center 2 sends the receiver information to the base station controlling device 3 for controlling the plurality of the base stations 40, 41, . . . covering an area that is included in the receiver information and that was indicated by the sending person. The base station controlling device 3 sending the receiver information sends the receiver information to more than one base station 40, preferably to the plurality of the base stations 40, 41, . . . And the base station 40 sends power-ON information based on the receiver information received from the base station controlling device 3, by using at least one of common channels. The receiver cellular phone 5, which the receiving person possesses and the sending person wants to communicate with the receiving person by, can detect the power-ON information sent from the base station 3 even if a main power source of the receiver cellular phone 5 is turned OFF.

Figure 2:
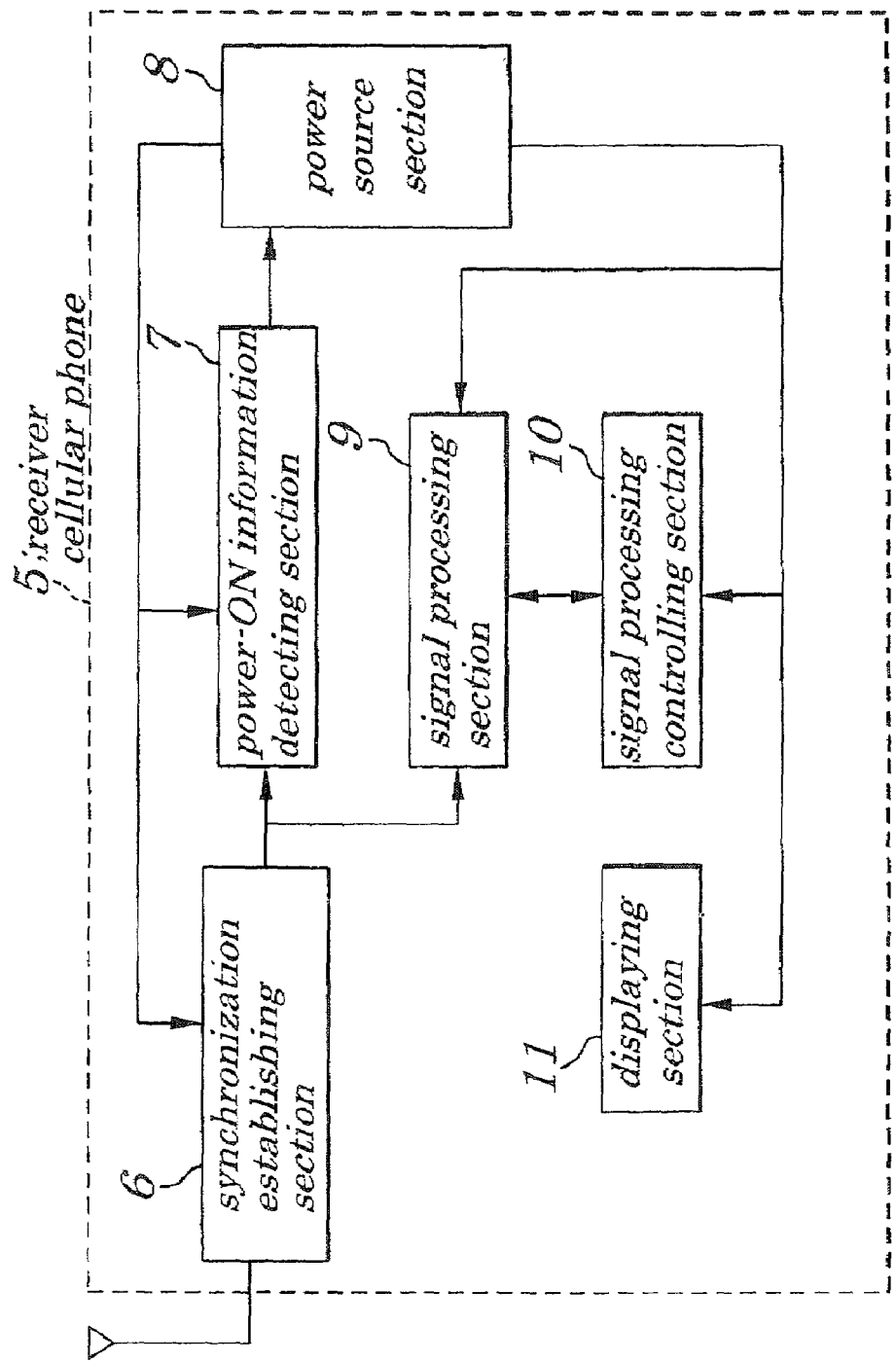
FIG. 2 is a block diagram showing a configuration of a receiver cellular phone according to the first embodiment.

In an internal configuration as shown in FIG. 2, the receiver cellular phone 5 used by the receiving person includes a synchronization establishing section (circuit) 6 for establishing a synchronization with the base station 40, 41, . . . , a power-ON information detecting section (circuit) 7 extracting the power-ON information from a radio wave transmitted from the base station 40, 41, . . . , a power source section (circuit) 8 for supplying electric power to the synchronization establishing section 6 and the power-ON information detecting section 7, such that the synchronization establishing section 6 and the power-ON information detecting section 7 remain in an active state, even if the main power source is turned OFF and turning ON the main power source when the power-ON information is input from the power-ON information detecting section 7, a signal processing section (unit) 9 for sending and receiving a signal, a signal processing controlling section (circuit) 10 for controlling the signal processing section 9, and a displaying section 11 for displaying information such as characters, numbers, or a like.

Operations according to the first embodiment will now be described.

The sending person inputs the receiver information for the receiving person whom the sending person wants to communicate with, to the service center 2 by using the sender cellular phone 1.

The service center 2 sends the receiver information including at least area information to the base station controlling device 3 controlling the plurality of the base stations 40, 41, . . . in the area covering an indicated area indicated by the area information, based on information including the area information indicated by the sending person. The base station controlling device 3 sends the receiver information to all of the plurality of the base stations 40, 41, . . . The base station 40, 41, . . . receives the receiver information from the base station controlling device 3, and then transmits the power-ON information on a radio wave by using at least one of the common channels.

At this time, in order not to operate a power source of any cellular phones other than the receiver cellular phone 5, the power-ON information is encrypted by using the receiver information (the cellular phone telephone number, password information predetermined by the receiving person, and a like) for only a channel signal of the power-ON information. In this case, an encrypting method cannot be specifically limited.

The receiver cellular phone 5 used in the notification system 100 will now be described with reference to FIG. 2.

In the receiver cellular phone 5 according to the embodiment of the present invention, the synchronization establishing section 6 and the power-ON information detecting section 7 always remain in the power-ON state even if the main power source is set to be in a power-OFF state.

The receiver cellular phone 5 always receives the radio wave from the base station 40 by an antenna shown but not labeled and then establishes synchronization with the base station 40 by the synchronization establishing section 6. In a state In which the synchronization is established, the radio wave including the channel signal of the power-ON information is input to the power-ON information detecting section 7 via the antenna shown but not labeled and the synchronization establishing section 6.

In the power-ON information detecting section 7, at least the cellular phone telephone number and the password predetermined by the receiving person are stored and maintained, and decrypts the channel signal encrypted and included in the power-ON information by using the maintained cellular phone telephone number and the password, and then obtains the power-ON information.

A main power source switch in the power source section 8 is turned ON by using the power-ON information obtained in the power-ON information detecting section 7. Thus, power is supplied to each of the signal processing section 9, the signal process controlling section 10, and the displaying section 11.

By supplying the power to the signal processing section 9 and the signal process controlling section 10, the receiver cellular phone 5 used in the present invention becomes in a state of being capable of receiving signals from the sender cellular phone 1 via the base station 40 (receive mode). Therefore, the receiving person can know that the receiver cellular phone 5 is set to be in the receive mode so as to become communicable with sender cellular phone 1.

Second Embodiment

A notification system 200 will be described with reference to FIG. 3 and FIG. 4.

In the second embodiment, a case for a sending person to know a location of a receiving person will be illustrated.

First, a configuration of the notification system 200 will now be described according to the second embodiment.

In the second embodiment, in addition to the first embodiment, a location information system is additionally provided to inform location information.

Figure 3:
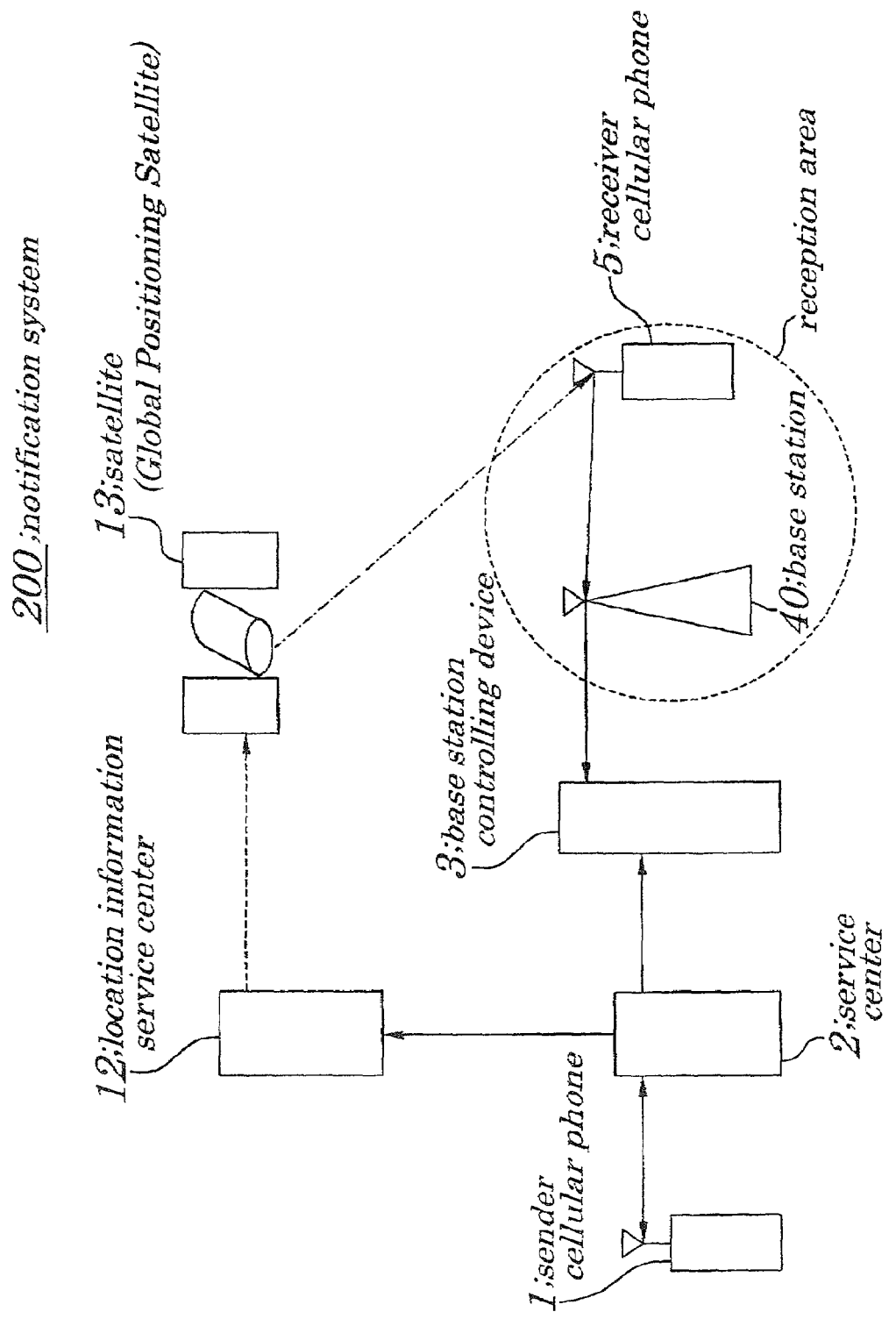
FIG. 3 is a diagram showing a configuration of a notification system according to a second embodiment of the present invention.
Figure 4:
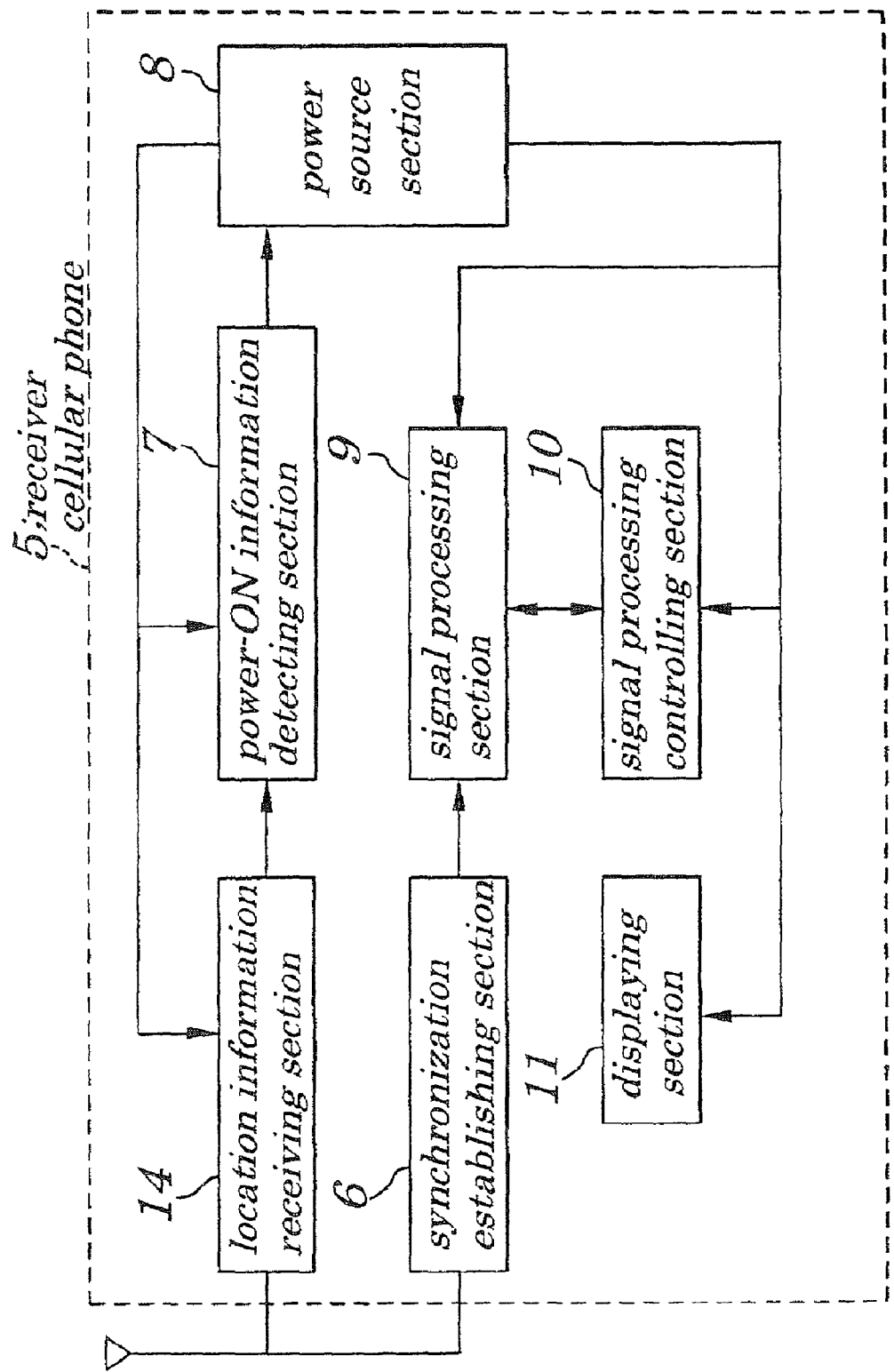
FIG. 4 is a block diagram showing a configuration of a receiver cellular phone according to the second embodiment.

That is, as shown in FIG. 3, the notification system 200 includes a communication device (a sender cellular phone 1) at a sender side, a service center 2, a base station controlling device 3, at least one base station 40, a receiver cellular phone 5. The notification system 200 further includes a location information service center 12 and a GPS (Global Positioning Satellite) satellite 13, as a location information system.

The location information service center 12 is connected to the service center 2 and the location information service center 12 and the GPS satellite 13 are connected through a radio system.

The sender cellular phone I of the sending person can obtain power-ON information and location information for the receiver cellular phone 5 of the receiving person from the location information service center 12.

In this case, in order for only the receiver cellular phone 5 of the receiving person to be notified, preferably, the power-ON information is encrypted with receiver information (cellular phone telephone numbers, password or a like), and emits the location information where the power-ON information encrypted with the receiver information is additionally provided, to the earth.

By transmitting the power-ON information together with a GPS signal, the receiver cellular phone 5 being in a power-OFF state is turned ON. Therefore, it is possible for the receiver cellular phone 5 to accept necessary information from the sending person.

Operations according to the second embodiment will now be described.

In the configuration according to second embodiment of the present invention, similarly to the first embodiment, the sending person sends the receiver information, which is the same as that described in the first embodiment, to the service center 2 by using the sender cellular phone 1. The service center 2 notifies the location information accented from the sender cellular phone 1 of the location information service center 12. For example, the location information service center 12 additionally provides the power-ON information to the receiver information received from the service center 2 and then sends a signal carrying the receiver information to the GPS satellite 13.

When the GPS satellite 13 receives the signal, the GPS satellite 13 encrypts the power-ON information by using the receiver information to generate an encrypted signal in order for only the receiver cellular phone 5 of the receiving person to be notified, and then emits the location information together with the encrypted signal to the earth.

The receiver cellular phone 5 receives the location information and the encrypted signal from at least one GPS satellite. A location information receiving section (circuit) 14 (FIG. 4) sends the encrypted signal only to a power-ON information detecting section 7. The power-ON information detecting section 7 preferably decrypts the encrypted signal sent from the location information receiving section 14, and confirms whether or not the receiver cellular phone 5 is a target cellular phone desired to turn ON, and then turns a main power source ON when it is confirmed that the receiver cellular phone 5 is the target cellular phone.

When the main power source is ON and after a synchronization establishing section 6 synchronizes with the base station 40, the location information is sent to the base station 40. The receiver cellular phone 5, which is used in the notification system 200 according to the second embodiment, preferably further includes the location information receiving section 14 as shown in FIG. 4. Thus, it is possible to extract a GPS signal component and detect current location information. In the receiver cellular phone 5 according to the second embodiment, instead of inputting a signal input through a synchronization establishing signal to the power-ON information detecting section 7 in the first embodiment, the current location information is extracted by the location information receiving section 14 receiving the signal from the GPS satellite 13 as described above, and then the signal is sent to the power-ON information detecting section 7. In addition, the GPS signal includes location information as a regular GPS signal, the receiver information of the receiver cellular phone 5, a signal for setting the receiver cellular phone 5 to be ON. Operations other than those described above are similar to the operations of the receiver cellular phone 5 used in the notification system 100 according to the first embodiment.

When the base station 40 receives the location information, the base station 40 notifies the location information of the sender cellular phone 1 through the base station controlling device 3 and the service center 2 such that the sending person can know a location of the receiving person. In the second embodiment, by using the GPS satellite 13, the location information together with the signal for switching the receiver cellular phone 5 to be in the power-ON state is transmitted to the receiving person (owner having the receiver cellular phone 5 which the sending person wants to inform).

Alternatively, instead of using the GPS satellite 13, the signal for switching the receiver cellular phone 5 to be in the power-ON state by using an arbitrary artificial satellite (not shown), the receiver cellular phone 5 is turned ON. The receiver cellular phone 5 being in the power-ON state transmits a signal to connect to the base station 40. Thus, a triangulation can be conducted by at least two base stations 40 and 41 of the base stations 40, 41, . . . and the receiver cellular phone 5, and then the location of the receiving person can be detected. For example, by the triangulation of at least two base stations 40 and 41 and the receiver cellular phone 5, the location of the receiving person can be obtained by the base station controlling device 3 based on a time difference between times when the base stations 40 and 41 received. As the receiving cellular phone 5 used in the second embodiment, the configuration of the receiving cellular phone 5 described in FIG. 5 can be applied. In this case, as a signal to be received, a satellite signal for setting the receiver cellular phone 5 of the receiving person to be in the power-ON state can be used. Moreover, in FIG. 2 and FIG. 4, as an antenna (not shown or labeled), two antennas may be used to receive the GPS signal and for the base station 40. Alternatively, a common antenna may be used.

Moreover, similarly, a method for obtaining the location of the receiving person by using at least two base stations 40 and 41 of a plurality of base stations 40, 41, . . . can be applies to the first embodiment. In a case in which at least two base stations 40 and 41 of the plurality of the base stations 40, 41, . . . are used, when a difference between two detected locations of the receiving person by two base stations 40 and 41 is greater, in order to improve an accuracy of the detected location, a plurality of time differences between received times from the receiver cellular phone 5 by other combinations of two of the plurality of base stations 40, 41, . . . may be utilized. In the first embodiment, the receiver information includes the cellular phone telephone number, the password, and area information. But, a part of the receiver information can be omitted. For example, either one of the password and the cellular phone telephone number can be omitted and the area information can be omitted if the area is limited.

It is apparent that the present invention is not limited to the above embodiments but may be changed and modified without departing from the scope and spirit of the invention.

What is claimed is:

1. A notification system for communicating between a sender cellular phone and a receiver cellular phone comprising:
   a base station controlling device for receiving receiver information concerning said receiver cellular phone, and for controlling a base station covering an area indicated in said receiver information;
   a sub-system configuration in said base station for sending power-ON information based on said receiver information received from said base station controlling device;
   a device configuration in said receiver cellular phone for receiving said power-ON information from said base station even if a main power source of said receiver cellular phone is in an OFF state; and
   a location information system for sending said receiver information and a signal for switching said receiver cellular phone to be in said ON state for incorporation into a Global Positioning Satellite signal.

2. A cellular phone comprising:
   a device configuration for receiving a signal from a base station for switching to be in an ON state and being capable of switching a main power source to be in said ON state even if said main power source is in an OFF state;
   a location information detecting section for detecting location information and main power source ON information from a Global Positioning Satellite signal;
   a main power source ON information detecting section for detecting said main power source ON information from said Global Positioning Satellite signal; and
   a power source section for supplying electric power to said main power source ON information detecting section and said location information detecting section to be kept in an ON-state, even if said main power source is in said OFF state, and for turning ON said main power source when said main power source ON information is input from said main power source ON information detecting section.

3. A cellular phone comprising:
   a device configuration for receiving a signal from a base station for switching to be in an ON state and being capable of switching a main power source to be in said ON state even if said main power source is in an OFF state, wherein said cellular phone is used as a receiver cellular phone in a notification system for communicating between a sender cellular phone and said receiver cellular phone, wherein said notification system comprises:
   a system configuration for allowing said sender cellular phone to transmit an ON state indication signal indicating to switch ON a main power source of said receiver cellular phone through a radio wave to said receiver cellular phone, such that a main power source of said receiver cellular phone is remotely turned ON,
   a base station controlling device for receiving receiver information concerning said receiver cellular phone which said main power source is in said OFF state, and for controlling a base station covering an area indicated in said receiver information, said base station further sending said receiver information, and
   a location information system for sending said receiver information, a signal for switching said receiver cellular phone to be in said ON state by carrying on a Global Positioning Satellite signal,
   wherein said base station comprises a sub-system configuration for sending power-ON information based on said receiver information received from said base station controlling device; and
   wherein said receiver cellular phone comprises a device configuration for receiving said power-ON information from said base station even if said main power source is in said OFF state.

* * * * *